United States Patent
Seo et al.

(10) Patent No.: US 8,954,693 B2
(45) Date of Patent: Feb. 10, 2015

(54) DATA STORAGE DEVICE WITH SELECTIVE DATA COMPRESSION

(75) Inventors: Mankeun Seo, Hwaseong-Si (KR); Daewook Kim, Seoul (KR); Hong Rak Son, Anyang-Si (KR); Junjin Kong, Yongin-Si (KR); Seonghoon Woo, Hwaseong-Si (KR); Soonjae Won, Yongin-Si (KR); Pilsang Yoon, Hwaseong-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 182 days.

(21) Appl. No.: 13/617,786

(22) Filed: Sep. 14, 2012

(65) Prior Publication Data
US 2013/0179659 A1 Jul. 11, 2013

(30) Foreign Application Priority Data
Jan. 9, 2012 (KR) ........................ 10-2012-0002554

(51) Int. Cl.
*G06F 12/04* (2006.01)
(52) U.S. Cl.
USPC .................... 711/161; 711/216; 711/E12.018
(58) Field of Classification Search
USPC ........... 711/154, 161, 216, E12.015, E12.018
See application file for complete search history.

(56) References Cited

U.S. PATENT DOCUMENTS

| | | | |
|---|---|---|---|
| 5,841,376 A | 11/1998 | Hayashi | |
| 8,489,832 B1* | 7/2013 | Mundschau et al. | 711/162 |
| 2008/0288436 A1 | 11/2008 | Priya | |
| 2010/0306631 A1* | 12/2010 | Cheong et al. | 714/800 |
| 2011/0161559 A1 | 6/2011 | Yurzola et al. | |
| 2011/0320915 A1* | 12/2011 | Khan | 714/773 |
| 2012/0023112 A1* | 1/2012 | Levow et al. | 707/749 |
| 2012/0166752 A1* | 6/2012 | Taniyama | 711/170 |
| 2013/0007346 A1* | 1/2013 | Khan | 711/103 |

FOREIGN PATENT DOCUMENTS

| | | |
|---|---|---|
| JP | 10-200415 | 7/1998 |
| KR | 1020050003068 A | 1/2005 |
| KR | 1020110007865 A | 1/2011 |

* cited by examiner

*Primary Examiner* — Hal Schnee
(74) *Attorney, Agent, or Firm* — Volentine & Whitt, PLLC

(57) ABSTRACT

A memory controller comprises a host interface block comprising a compression ratio calculator configured to determine whether a compression ratio of input data exceeds a predetermined compression ratio, and a compression block configured to compress the input data as a consequence of the host compression ratio calculator determining that the compression ratio exceeds the predetermined compression ratio.

20 Claims, 18 Drawing Sheets

6000

Host

6100

Storage

DATA STORAGE DEVICE WITH SELECTIVE DATA COMPRESSION

CROSS-REFERENCE TO RELATED APPLICATIONS

This application claims priority under 35 U.S.C. §119 to Korean Patent Application No. 10-2012-0002554 filed Jan. 9, 2012, the subject matter of which is hereby incorporated by reference.

BACKGROUND OF THE INVENTION

The inventive concept relates generally to electronic memory technologies. More particularly, the inventive concept relates to techniques for improving storage capacity and/or performance in various types of memory devices or systems.

Computer systems commonly use several types of memory devices having varying levels of storage capacity and performance. For example, most computer systems use a main memory comprising semiconductor devices having relatively fast access speed and providing temporary data storage, and a long-term memory having larger capacity and configured to provide persistent data storage.

In an effort to improve the overall performance and functionality of computer systems and other electronic equipment, researchers are continually seeking to increase the storage capacity and speed of most types of memory devices. These efforts tend to be focused on either improvements in memory hardware, or improvements in processing techniques used to store and retrieve data. Examples of hardware improvements include increases in the integration density of memory cells and increases in data transfer speed. On the other hand, examples of processing improvements include improved compression techniques, error correction, caching, and data organization.

SUMMARY OF THE INVENTION

In one embodiment of the inventive concept, a memory controller comprises a host interface block comprising a compression ratio calculator configured to determine whether a compression ratio of input data exceeds a predetermined compression ratio, and a compression block configured to compress the input data as a consequence of the host compression ratio calculator determining that the compression ratio exceeds the predetermined compression ratio.

In another embodiment of the inventive concept, a method of operating a memory system comprises determining a compression ratio of input data, comparing the determined compression ratio to a threshold, compressing the input data upon determining that the compression ratio exceeds the threshold, and storing the compressed input data in a storage medium.

These and other embodiments of the inventive concept can potentially improve the storage capacity and/or performance of a data storage device or system by performing selective data compression according to patterns of data to be stored.

BRIEF DESCRIPTION OF THE DRAWINGS

The drawings illustrate selected embodiments of the inventive concept. In the drawings, like reference numbers indicate like features.

DETAILED DESCRIPTION

Embodiments of the inventive concept are described below with reference to the accompanying drawings. These embodiments are presented as teaching examples and should not be construed to limit the scope of the inventive concept.

In the description that follows, the terms "first", "second", "third", etc., may be used to describe various features, but the described features should not be limited by these terms. Rather, these terms are used merely to distinguish between different features. Thus, a first feature could be alternatively termed a second feature and vice versa without changing the meaning of the relevant description.

The terminology used herein is for the purpose of describing particular embodiments only and is not intended to limit the scope of the inventive concept. As used herein, the singular forms "a", "an" and "the" are intended to encompass the plural forms as well, unless the context clearly indicates otherwise. Terms such as "comprises" and/or "comprising," where used in this specification, indicate the presence of stated features but do not preclude the presence or addition of other features. As used herein, the term "and/or" includes any and all combinations of one or more of the associated listed items.

Where a feature is referred to as being "on", "connected to", "coupled to", or "adjacent to" another feature, it can be directly on, connected, coupled, or adjacent to the other feature, or intervening features may be present. In contrast, where a feature is referred to as being "directly on," "directly connected to", "directly coupled to", or "immediately adjacent to" another feature, there are no intervening features present.

Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and/or the present specification and will not be interpreted in an idealized or overly formal sense unless expressly so defined herein.

Figure 1:
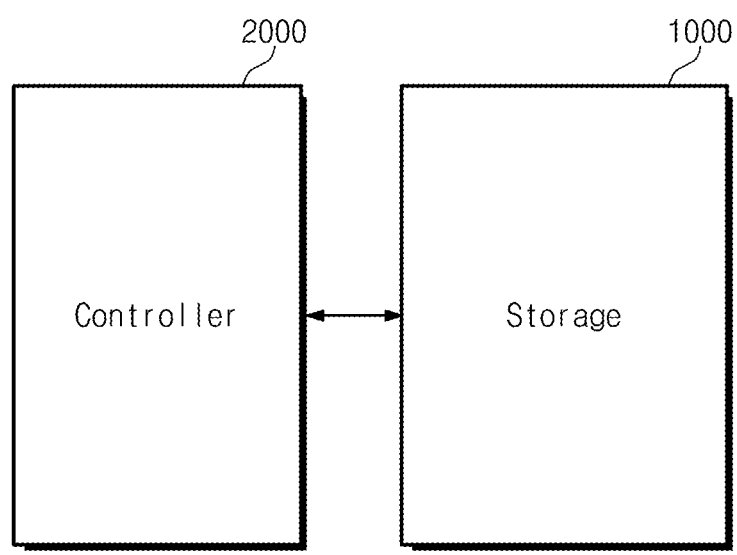
FIG. 1 is a block diagram of a data storage device according to an embodiment of the inventive concept.

FIG. 1 is a block diagram of a data storage device according to an embodiment of the inventive concept.

Referring to FIG. 1, the data storage device comprises a storage medium 1000 and a controller 2000. Storage medium 1000 can be used to store various types of information such as text, graphics, software codes, and the like. Storage medium 1000 may be formed of nonvolatile memories such as a NAND flash memory, a NOR flash memory, a phase-change RAM (PRAM), a ferroelectric RAM (FeRAM), a magnetoresistive RAM (MRAM), for example. Storage medium 1000, however, is not limited to specific types of nonvolatile memories.

Controller 2000 is configured to control storage medium 1000 in response to a request from an external device. Controller 2000 is configured to estimate (or predict or determine) a compression ratio of data provided from an external device. This estimate is typically performed without the use of additional information such as metadata. Where the compression ratio is estimated to be larger than a target compression ratio (or, a reference compression ratio), controller 2000 compresses the externally provided data and stores it at storage medium 1000. Where the compression ratio is estimated to be smaller than the target compression ratio (or, the reference compression ratio), controller 2000 stores the externally provided data directly at storage medium 1000. That is, where the compression ratio is estimated to be smaller than the target compression ratio, controller 2000 skips a compression operation of the externally provided data.

The selective compression of data can improve the performance of storage medium 1000, for example, by allowing it to store a greater amount of data at relatively low cost, by reducing the amount of data transferred between storage media 1000 and controller 2000, and reducing the number of memory access operations, power consumption, and write latency (or delay) that may be caused by unnecessary compression operations.

Figure 2:
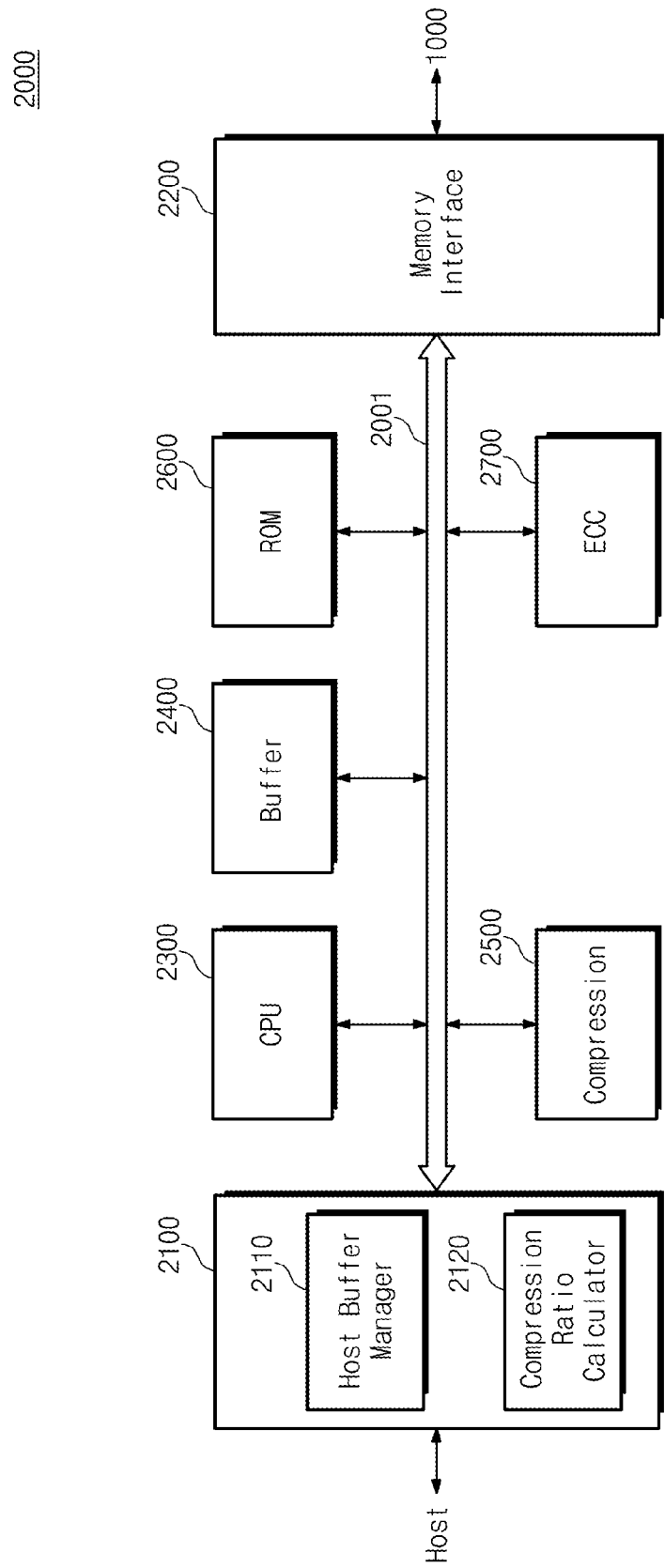
FIG. 2 is a block diagram of a controller shown in FIG. 1 according to an embodiment of the inventive concept.

FIG. 2 is a block diagram of controller 2000 illustrated in FIG. 1 according to an embodiment of the inventive concept.

Referring to FIG. 2, controller 2000 comprises a host interface block 2100 as a first interface, a memory interface block 2200 as a second interface, CPU 2300 as a processing unit, a buffer 2400, a compression block 2500, a ROM 2600, and an error correction code (ECC) block 2700.

Host interface block 2100 is configured to interface with an external device, such as a host, and memory interface block 2200 is configured to interface with storage medium 1000. CPU 2300 is configured to control overall operations of controller 2000. For example, CPU 2300 may be configured to operate firmware such as a memory translation layer (MTL) (or flash translation layer (FTL)) stored in ROM 2600. The MTL may be used to manage memory mapping information or other information. For example, the MTL may be used to manage wear-leveling, bad blocks, data retention upon unexpected power-off, and the like with respect to storage media 1000. ROM 2600 can be used selectively or optionally. For example, firmware may be stored in storage medium 1000 instead of ROM 2600, and may be loaded onto buffer 2400 at power-up.

Buffer 2400 is used to temporarily store data transferred from an external device via host interface block 2100. Buffer 2400 is used to temporarily store data transferred from storage medium 1000 via memory interface block 2200. Further, buffer 2400 may be used as a work memory of CPU 2300. Buffer 2400 is typically formed of a volatile memory device such as DRAM or SRAM or a nonvolatile memory device such as MRAM, FeFRAM, or PRAM. Compression block 2500 operates under control of CPU 2300 (or the MTL executed by CPU 2300) to compress data sequentially provided from buffer 2400 in compression units. Each unit of compressed data is stored in storage medium 1000 via memory interface block 2200. Compression block 2500 also operates under control of CPU 2300 to decompress data read out from storage medium 1000.

Host interface block 2100 comprises a host buffer manager 2110 and a compression ratio calculator 2120. Host buffer manager 2110 is configured to buffer data provided from a host in order to address a transfer speed difference between the host and a system bus 2001. Compression ratio calculator 2120 is configured to estimate, predict, or determine whether data provided to host buffer manager 2110 or output from the host buffer manager is compressible on-the-fly. Compression ratio calculator 2120 sends a result of this determination to compression block 2500, and the result is stored in a register of compression block 2500. After all write-requested data is input, CPU 2300 (or firmware executed by CPU 2300) determines whether to compress input data based on the result stored in the register of compression block 2500.

Where the data to be stored in storage medium 1000 does not require compression, no compression is performed on the data. Accordingly, a compression function of compression block 2500 is turned off and the data is stored in storage medium 1000 without compression. Otherwise, where the data to be stored in storage medium 1000 requires compression, the compression function is turned on, compression is performed on the data, and the compressed data is stored in storage medium 1000.

The compression ratio may be estimated by various alternative factors, such as a minimum operation and delay (or, latency). Moreover, it can be determined without header data or additional information from an upper layer (e.g., a file system, a host interface, etc.). A buffer access and a use of a bus bandwidth may be reduced by selectively compressing data that is expected to have high compression efficiency, based on the above-described scheme, and a delay (or, a latency) needed for a write process may be minimized.

Figure 3:
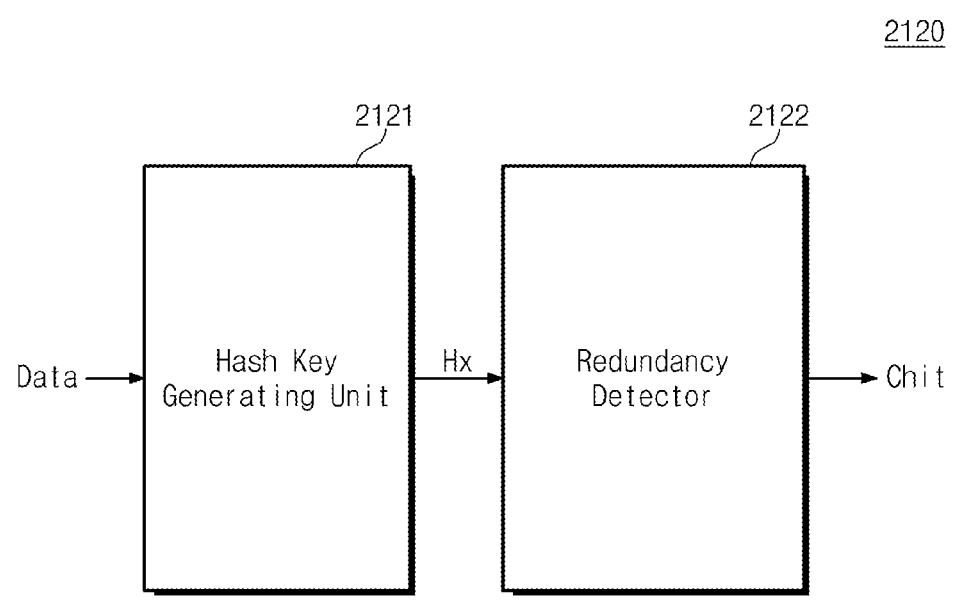
FIG. 3 is a block diagram of a compression ratio calculator shown in FIG. 2 according to an embodiment of the inventive concept.
Figure 4:
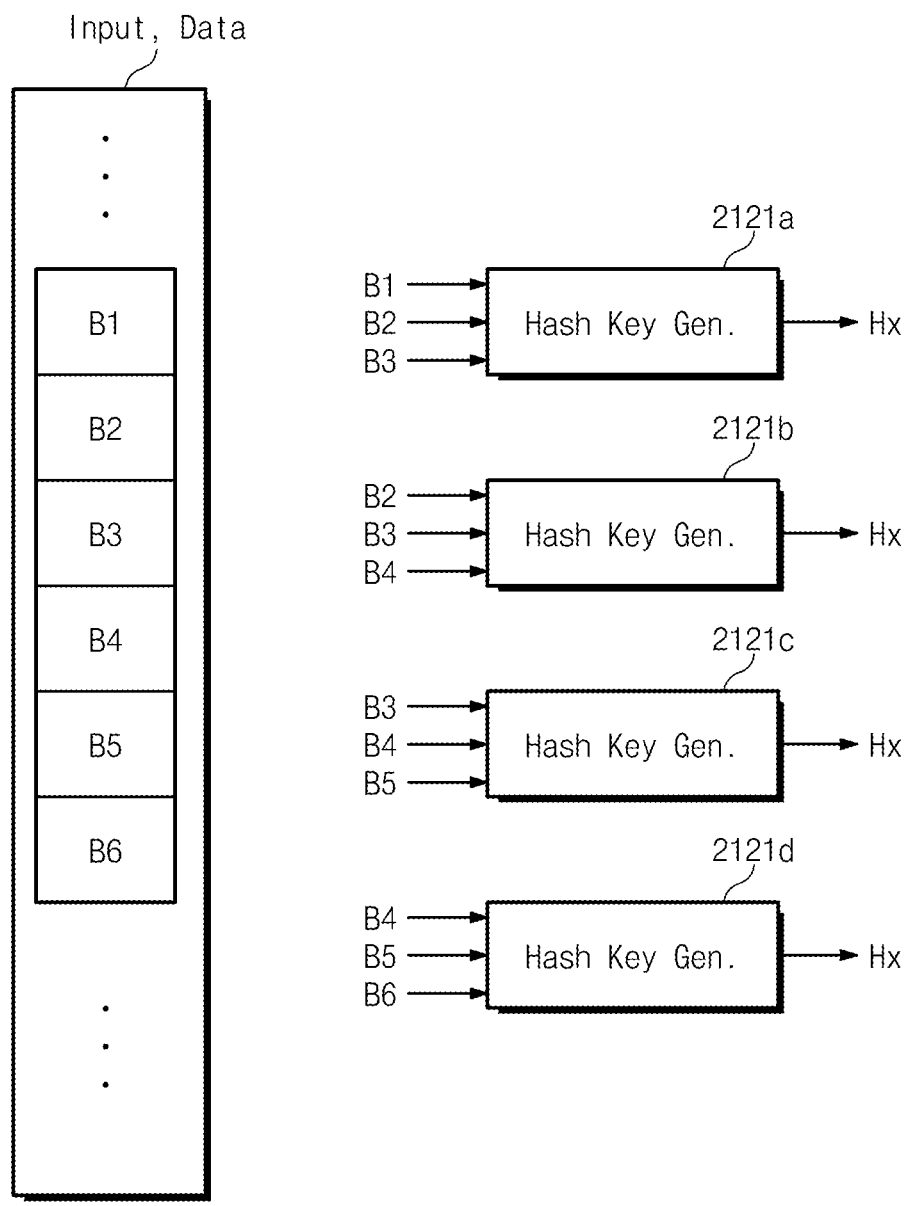
FIG. 4 is a block diagram of a hash key generating unit shown in FIG. 3 according to an embodiment of the inventive concept.

FIG. 3 is a block diagram of compression ratio calculator 2120 of FIG. 2 according to an embodiment of the inventive concept. FIG. 4 is a block diagram of a hash key generating unit 2120 in FIG. 3 according to an embodiment of the inventive concept.

Referring to FIG. 3, compression ratio calculator 2120 comprises hash key generating unit 2121 and a redundancy detector 2122. Hash key generating unit 2121 is configured to generate a hash key value based on input data. For example, hash key generating unit 2121 may sequentially receive data by a predetermined unit (e.g., n-bytes, n>1) to generate a hash key value of data input by the predetermined unit. Herein, the predetermined unit may be formed of a plurality of bytes, and first and second groups of bytes may be partially overlapped. Where a unit of currently input data has the same pattern as a unit of previously input data, a hash key value of the currently input data may be equal to a hash key value Hx of the previously input data. Where a pattern of currently input data is different from that of previously input data, a hash key value of the currently input data may be different from that a hash key value Hx of the previously input data.

Hash key generating unit 2121 typically comprises one or more hash key generators. For example, referring to FIG. 4, hash key generating unit 2121 comprises four hash key generators 2121*a*, 2121*b*, 2121*c*, and 2121*d*, although the number of hash key generators is not limited thereto. Hash key generators 2121*a*, 2121*b*, 2121*c*, and 2121*d* are configured substantially the same. Each of hash key generators 2121*a*, 2121*b*, 2121*c*, and 2121*d* receives data in a predetermined unit (e.g., a 3-byte unit) to generate a hash key value Hz corresponding to a pattern of input data. Each of hash key generators 2121*a*, 2121*b*, 2121*c*, and 2121*d* generates a hash key value Hx decided according to a data pattern. That is, where patterns of data input to a hash key generator are identical to each other, the same hash key value is generated. Where patterns of data input to a hash key generator are different from each other, different hash key values are generated. A unit of data provided to each of hash key generators 2121*a*, 2121*b*, 2121*c*, and 2121*d* may be changed variously.

Referring again to FIG. 3, redundancy detector 2122 detects a redundancy level based on a hash key value Hx generated by hash key generating unit 2121. In general, a high redundancy level means that a compression ratio is higher than a target compression ratio. The redundancy level may be determined according to a hit count of hash key values provided from hash key generating unit 2121. Redundancy detector 2122 generates a hit count value Chit indicating a redundancy level. Hit count value Chit may be stored in a register of a compression block 2500 in FIG. 2. In other embodiments, hit count value Chit may be temporarily stored at compression ration calculator 2120, and may be referenced by CPU 2300 to determine whether to compress data when an input of write-requested data is completed.

Figure 5:
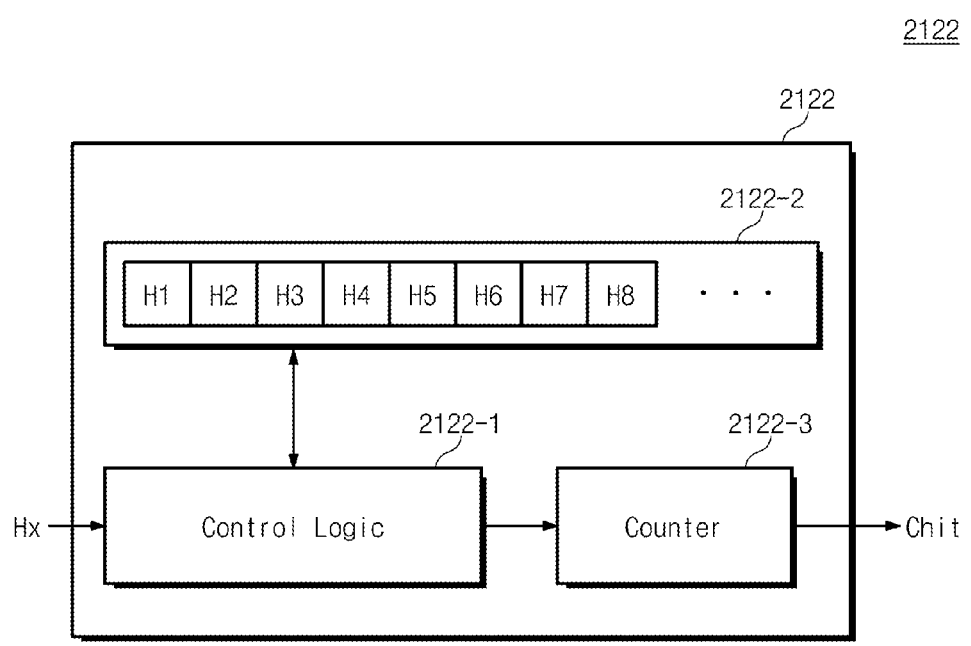
FIG. 5 is a block diagram of a redundancy detector shown in FIG. 3 according to an embodiment of the inventive concept.

FIG. 5 is a block diagram of redundancy detector 2122 of FIG. 3 according to an embodiment of the inventive concept.

Referring to FIG. 5, redundancy detector 2122 comprises control logic 2122-1, a hash table 2122-2, and a counter 2122-3. Control logic 2122-1 is configured to control overall operation of redundancy detector 2122. Hash table 2122-2 comprises entries corresponding to hash key values, respectively. Each entry is used to store information (e.g., a flag bit) indicating whether a corresponding hash key is generated. For example, where a currently input hash key value is 'H1', an entry H1 corresponding to the input hash key value may be set to '1' under the control of control logic 2122-1. An entry value may be used as an index indicating that a corresponding hash key value is generated. Where a specific hash key value is generated, an entry of hash table 2122-2 corresponding to the specific hash key value may be set to '1' under the control of control logic 2122-1. That is, control logic 2122-1 may determine whether a currently input hash key value has been generated previously, based on values of entries of hash table 2122-2. Where a currently input hash key value is determined to be generated previously, control logic 2122-1 controls counter 2122-3 such that a hit count value Chit increases by a predetermined value (e.g., 1). As described above, hit count value Chit may indicate a redundancy level. The larger hit count value Chit, the greater the amount of compressible data of write-requested data.

In alternative embodiments, redundancy detector 2120 may take alternative forms. For example, redundancy detector 2120 may comprise counts respectively corresponding to hash key values and an adder configured to add values of the counters. An output of the adder may be used as hit count value Chit.

Figure 6:
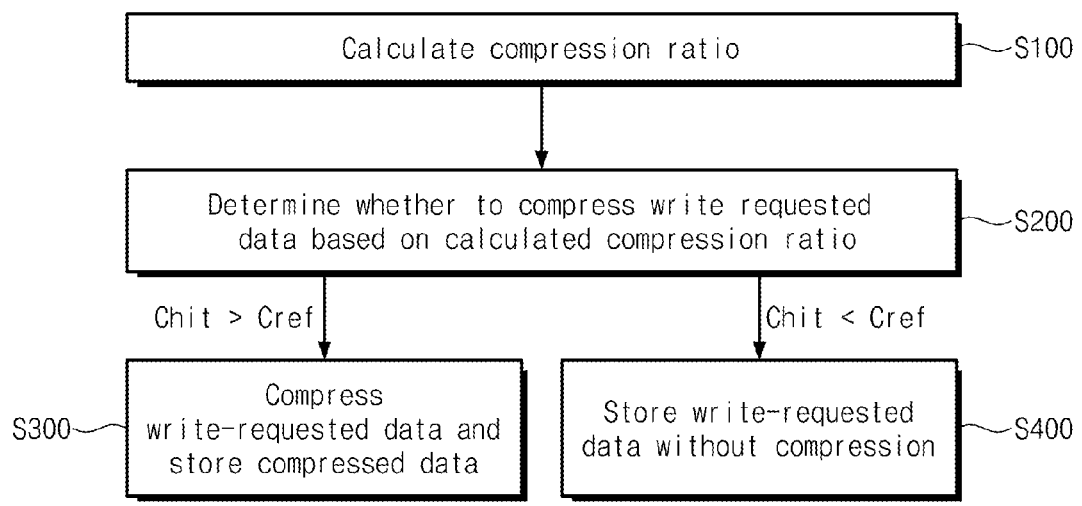
FIG. 6 is a flowchart illustrating a write method of a data storage device according to an embodiment of the inventive concept.
Figure 7:
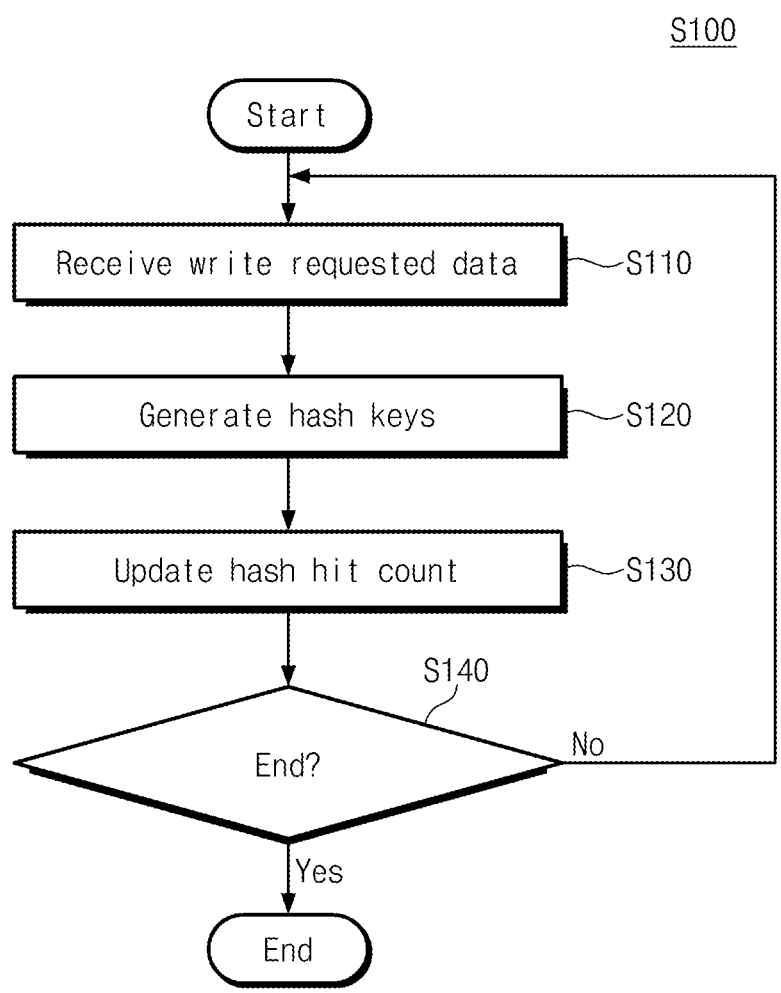
FIG. 7 is a flowchart illustrating an operation S100 performed in the method of FIG. 6 according to an embodiment of the inventive concept.

FIG. 6 is a flowchart illustrating a write method of a data storage device according to an embodiment of the inventive concept, and FIG. 7 is a flowchart illustrating an operation S100 of FIG. 6 according to an embodiment of the inventive concept. For convenience, the methods of FIGS. 6 and 7 will be described with reference to features of storage medium 1000 and controller 2000 as described above. However, the method could alternatively be performed by other equipment.

Referring to FIG. 6, write-requested data from a host is stored in buffer 2400 via host interface block 2100 under the control of CPU 2300. In operation S100, while the write-requested data is being sent to buffer 2400, compression ratio calculator 2120 calculates a compression ratio of the write-requested data in an on-the-fly manner. An operation of calculating the compression ratio, as illustrated in FIG. 7, may include receiving the write-requested data (S110), generating hash key values based on the write-requested data (S120), updating a hit count value Chit (S130), and determining whether all of the write-requested data is received (S140). Operations S110 to S140 may be iterated until all write-requested data is received. A hit count value Chit of the write-requested data may be stored at a register of a compression block 2500. Hit count value Chit can be generated in the same manner as is described with reference to FIGS. 3 to 5, so a description thereof will be omitted to avoid redundancy.

In some embodiments, the size of the write-requested data corresponds to a page. Alternatively, the size of the write-requested data may correspond to a part of a page of data or two or more pages. A compression ratio or a hit count value may be calculated by a page unit or a unit greater than or less than the page unit.

Referring again to FIG. 6, in operation 5200, the method determines whether to compress the write-requested data according to the calculated compression ratio or hit count value Chit. For example, where an input of the write-requested data is completed, CPU 2300 (or, firmware executed by CPU 2300) determines compression of the write-requested data based on a hit count value Chit stored at a register of a compression block 2500. In some embodiments, CPU 2300 (or, firmware executed by CPU 2300) determines whether the calculated hit count value Chit is larger than a reference value Cref indicating a target compression ratio. Where the calculated hit count value Chit is larger than reference value Cref indicating the target compression ratio, the method proceeds to operation 5300. Otherwise, where the calculated hit count value Chit is smaller than reference value Cref indicating the target compression ratio, the method proceeds to operation 5400.

In operation 5300, the write-requested data stored in buffer 2400 is compressed via compression block 2500, and the compressed data is stored in storage medium 1000 via memory interface block 2200. Parity information for the compressed data is generated by ECC block 2700. Where the calculated hit count value Chit is larger than reference value Cref indicating the target compression ratio, the write-requested data may comprise many duplicate data patterns. Accordingly, a compression ratio of the write-requested data may be high. In other words, the compression ratio of the write-requested data may be higher than the target compression ratio.

In some embodiments, compression block 2500 compresses the write-requested data stored in buffer 2400 and stores it in buffer 2400. This compression operation may be performed via system bus 2001. That is, during the compression operation, system bus 2001 may be occupied by compression block 2500. Upon completion of the compression operation, the compressed data is transferred to storage medium 1000 via memory interface block 2200 under control of CPU 2300. The compressed data is sent directly to storage medium 1000 without buffering.

In operation S400, the write-requested data stored in buffer 2400 is directly stored in storage medium 1000 via memory interface block 2200 without compression. Parity information about the compressed data may be generated by ECC block 2700. Where the calculated hit count value Chit is smaller than reference value Cref indicating the target compression ratio, the write-requested data comprises less duplicate data patterns. For this reason, a compression ratio of the write-requested data may be low. That is, a compression ratio of the write-requested data may be lower than the target compression ratio.

Figure 8:
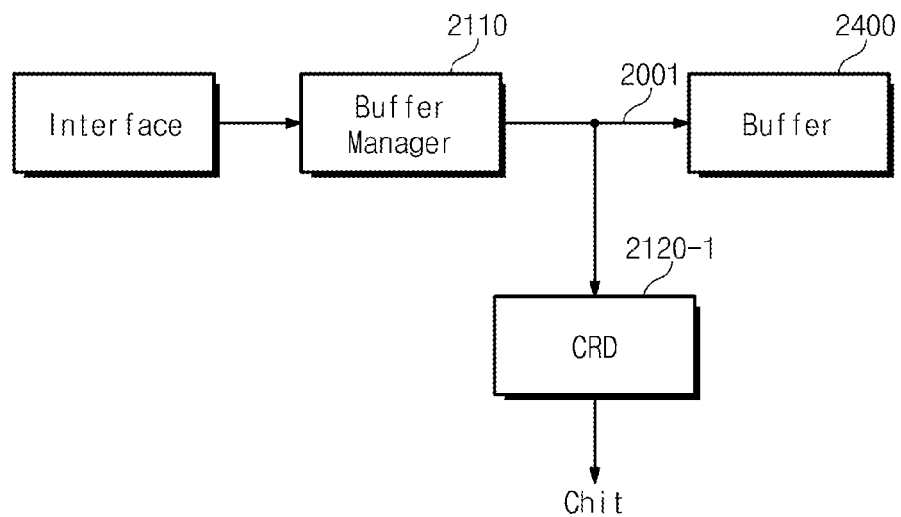
FIGS. 8 and 9 are block diagrams illustrating different physical locations of a compression ratio calculator according to embodiments of the inventive concept.
Figure 9:
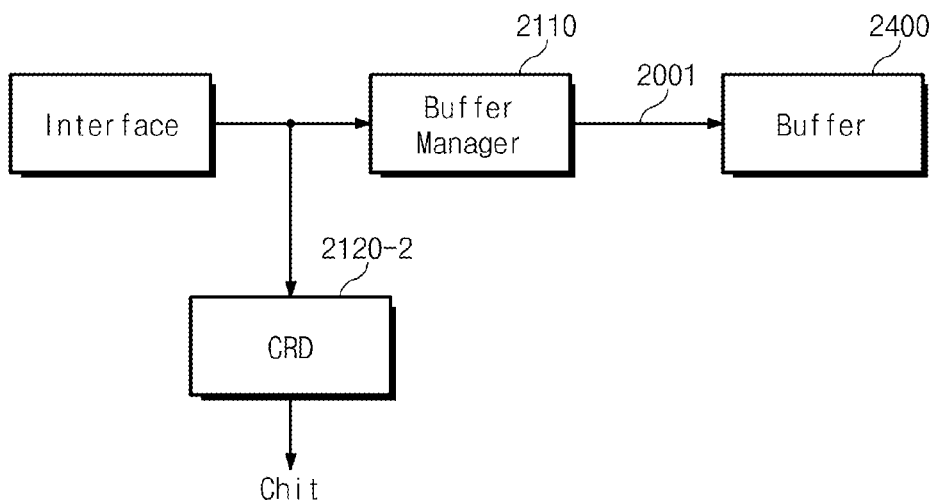

FIGS. 8 and 9 are block diagrams illustrating example physical locations of compression ratio calculator 2120 according to embodiments of the inventive concept.

As illustrated in FIG. 8, compression ratio calculator 2120-1 is configured to perform on-the-fly calculation of a compression ratio (or, a hit count value) of write-requested data, based on data output from host buffer manager 2110. Alternatively, as illustrated in FIG. 9, compression ratio calculator 2120-2 may be configured to perform on-the-fly calculation on a compression ratio (or, a hit count value) of write-requested data, based on data provided to host buffer manager 2110. However, the physical location of compression ratio calculator 2120 is not limited to the examples shown in FIGS. 8 and 9.

Figure 10:
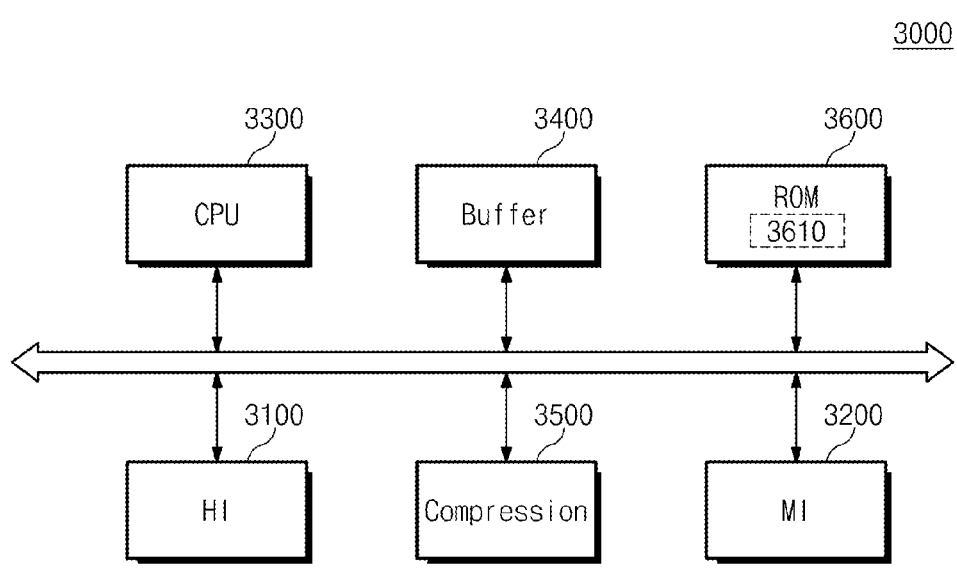
FIG. 10 is a block diagram of a controller illustrated in FIG. 1 according to another embodiment of the inventive concept.

FIG. 10 is a block diagram of controller 2000 illustrated in FIG. 1 according to another embodiment of the inventive concept. The example of controller 2000 as shown in FIG. 10 is labeled controller 3000 to distinguish it from the example of controller 200 shown in FIG. 2.

Referring to FIG. 10, controller 3000 comprises a first interface 3100, a second interface 3200, a CPU 3300 as a processing unit, a buffer 3400, a compression block 3500, and ROM 3600. Features 3100 through 3500 of FIG. 10 are substantially the same as corresponding features shown FIG. 2, so a detailed description of these features is omitted in order to avoid redundancy. ROM 3600 stores firmware 3610 (for example, a memory translation layer) supporting a compression ratio calculating function described above. Firmware 3610 in ROM 3600 is executed by CPU 3300. Controller 3000 operates in substantially the same manner as described in FIG. 2, except that a compression ratio (or, hit count value) calculating function is executed in software.

Figure 11:
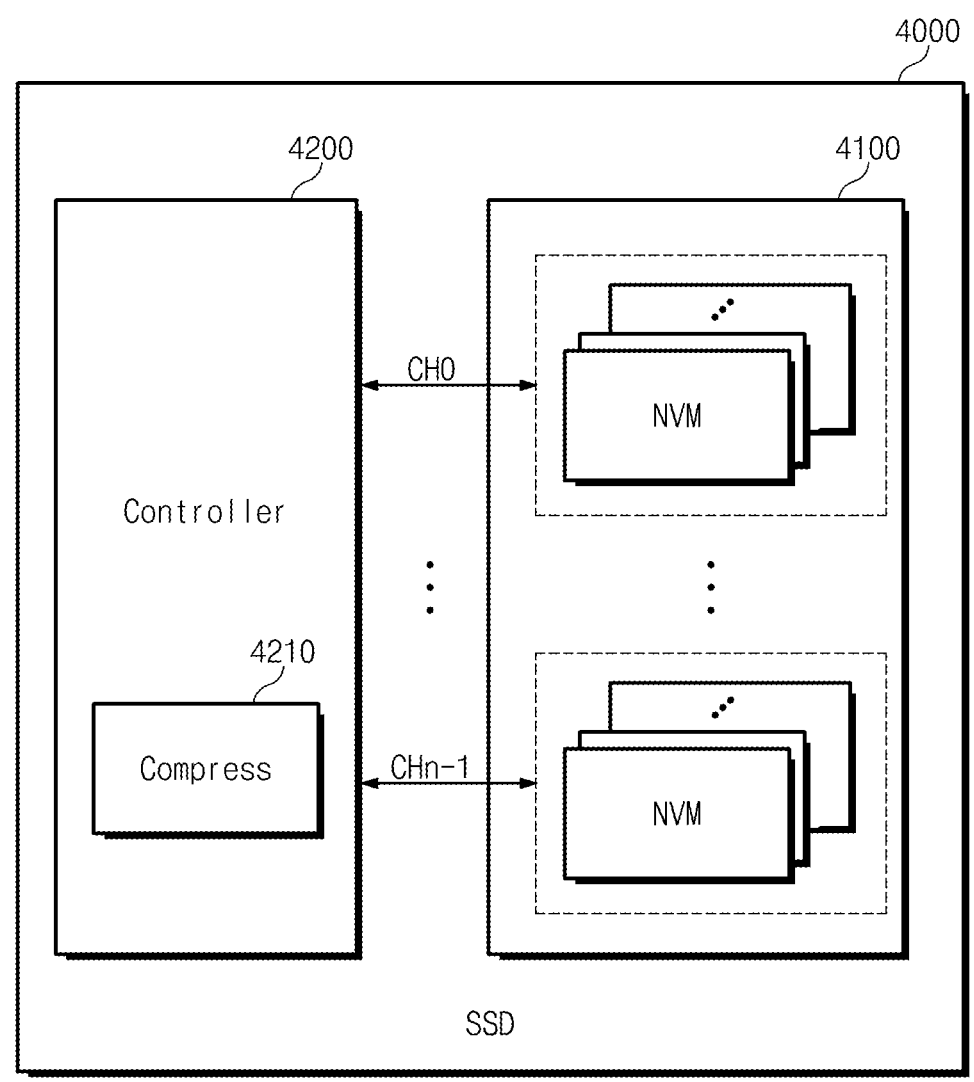
FIG. 11 is a block diagram of a solid state drive (SSD) using a compression ratio calculating scheme according to an embodiment of the inventive concept.

FIG. 11 is a block diagram of an SSD 4000 using a compression ratio calculating scheme as described above according to an embodiment of the inventive concept.

Referring to FIG. 11, SSD 4000 comprises a storage medium 4100 and a controller 4200. Storage medium 4100 is connected to controller 4200 via a plurality of channels CH0 to CHn-1. Each of channels CH0 to CHn-1 is connected in common with a plurality of nonvolatile memories. Controller 4200 comprises a compression block 4210 that compresses data and decompresses data. A compression function of compression block 4210 is selectively activated according to a hit count value obtained in the same manner as described with reference to FIGS. 2 to 9.

Figure 12:
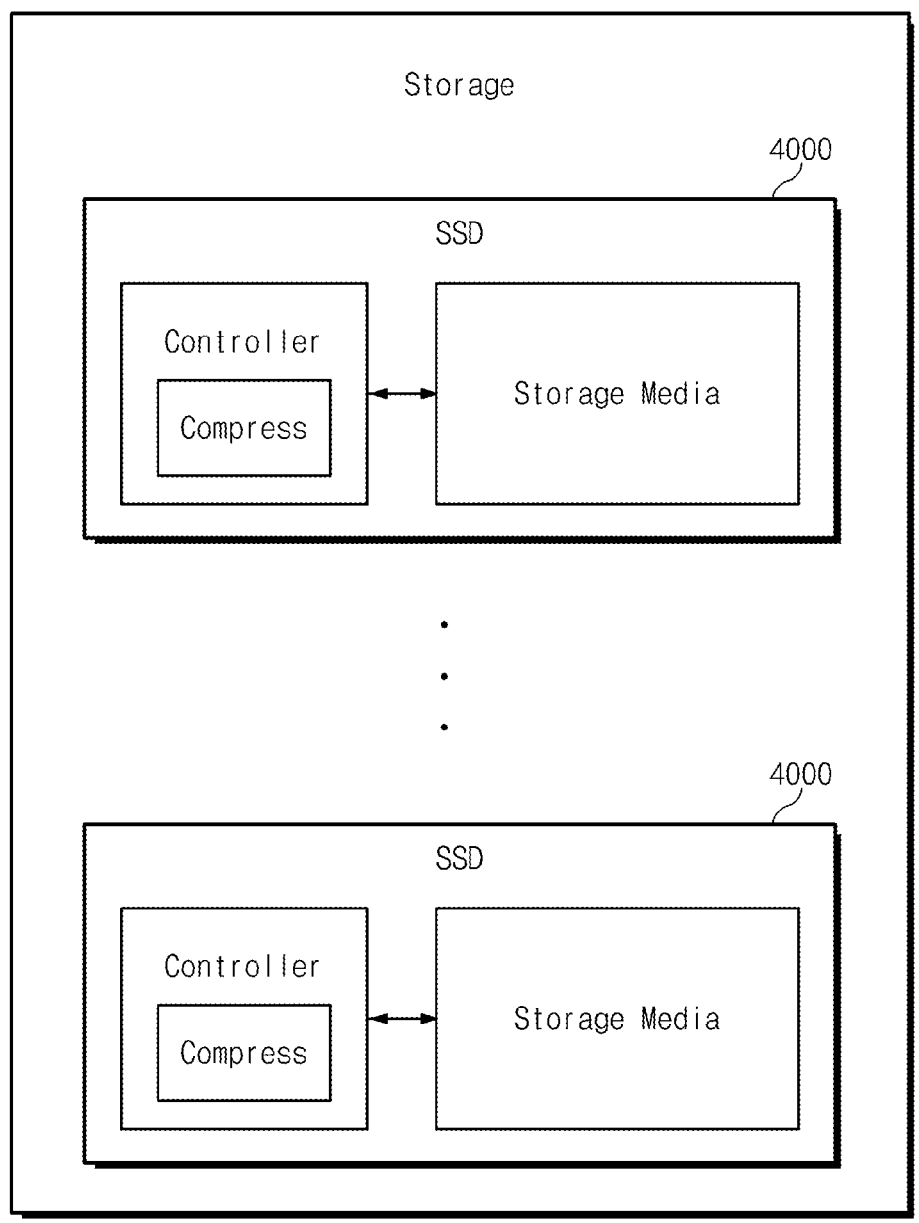
FIG. 12 is a block diagram of storage apparatus incorporating the SSD of FIG. 11 according to an embodiment of the inventive concept.
Figure 13:
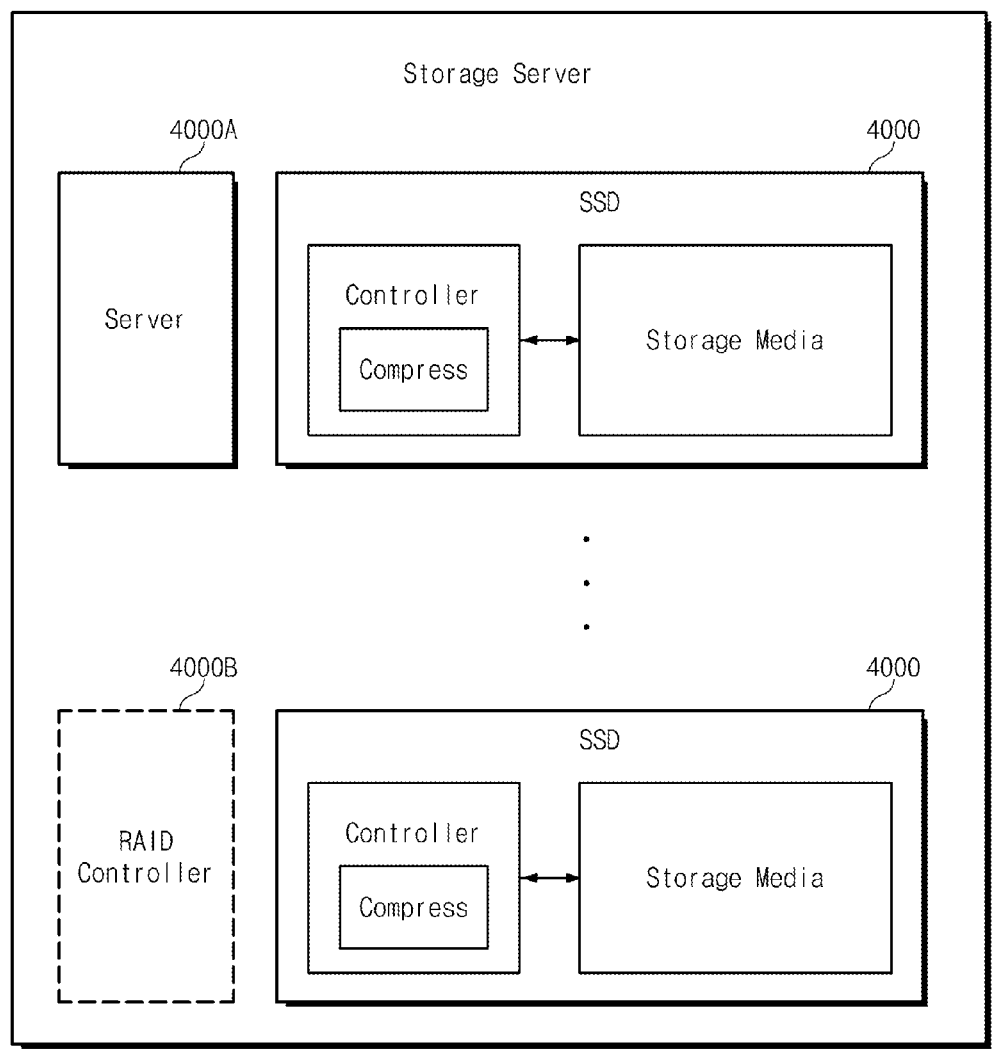
FIG. 13 is a block diagram of a storage server incorporating the SSD of FIG. 11 according to an embodiment of the inventive concept.

FIG. 12 is a block diagram of storage apparatus incorporating SSD 4000 of FIG. 11 according to an embodiment of the inventive concept and FIG. 13 is a block diagram of a storage server incorporating SSD 4000 of FIG. 11 according to an embodiment of the inventive concept.

As illustrated in FIG. 12, the storage apparatus comprises a plurality of SSDs 4000 configured substantially the same as that illustrated in FIG. 11. As illustrated in FIG. 13, the storage server comprises a plurality of SSDs 4000 configured the same as that described in FIG. 11, and a server 4000A for controlling overall operations of the storage server. The storage server further comprises a redundant array of independent disks (RAID) controller 4000B for parity management according to a parity manner applied to repair defects on data stored in solid state drives 4000.

Figure 14:
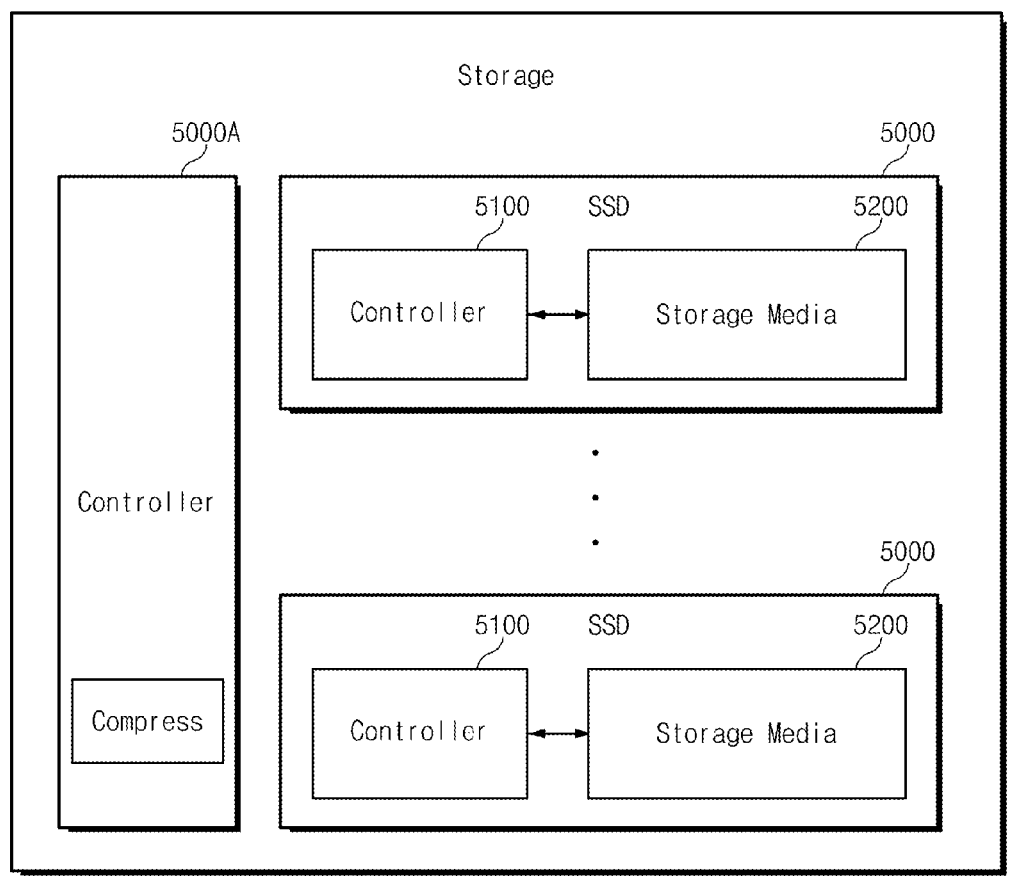
FIG. 14 is a block diagram of storage apparatus according to another embodiment of the inventive concept.
Figure 15:
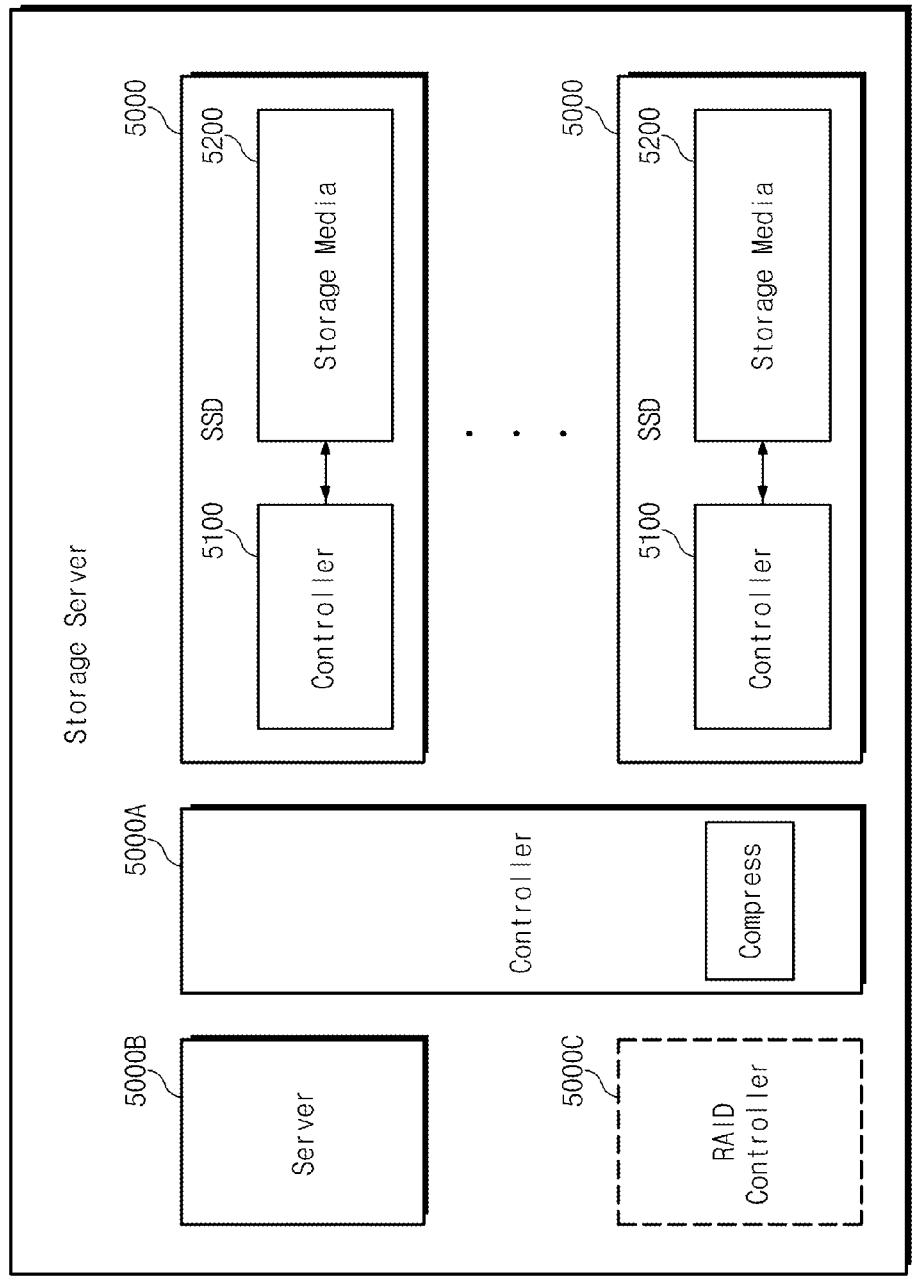
FIG. 15 is a block diagram of a storage server incorporating the storage apparatus of FIG. 14.

FIG. 14 is a block diagram of a storage apparatus according to another embodiment of the inventive concept, and FIG. 15 is a block diagram of a storage server incorporating the storage apparatus of FIG. 14 according to an embodiment of the inventive concept.

Referring to FIG. 14, the storage apparatus comprises a plurality of SSDs 5000 and a control block 5000A. Each of SSDs 5000 comprises a controller 5100 and a storage medium 5200. Controller 5100 interfaces with storage medium 5200. SSDs 5000 are controlled by control block 5000A, which is configured to perform the above-described function (for example, a compression ratio/hit count value calculating function). The storage configuration in FIG. 14 may be used to form a storage server. As illustrated in FIG. 15, an example storage server comprises SSDs 5000 and 5000A configured substantially the same as those illustrated FIG. 14, and a server 5000B. The storage server further comprises a RAID controller 5000C for parity management according to a parity manner applied to repair defects on data stored in SSDs 5000.

Figure 16:
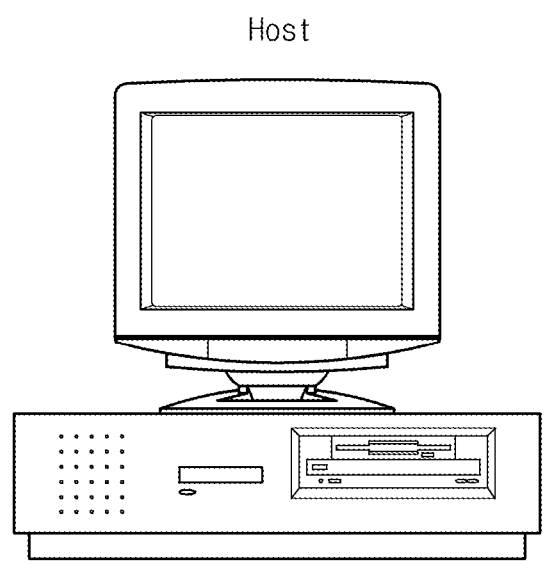
FIGS. 16 to 18 are diagrams of various systems incorporating a data storage device according to embodiments of the inventive concept.
Figure 16:
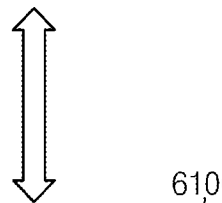
Figure 16:
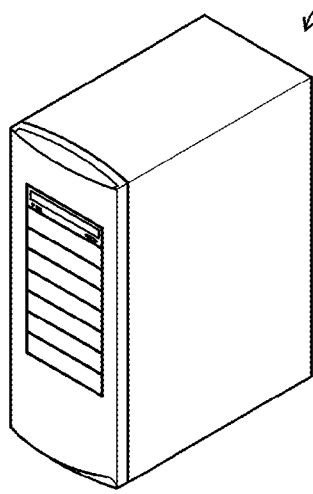
Figure 17:
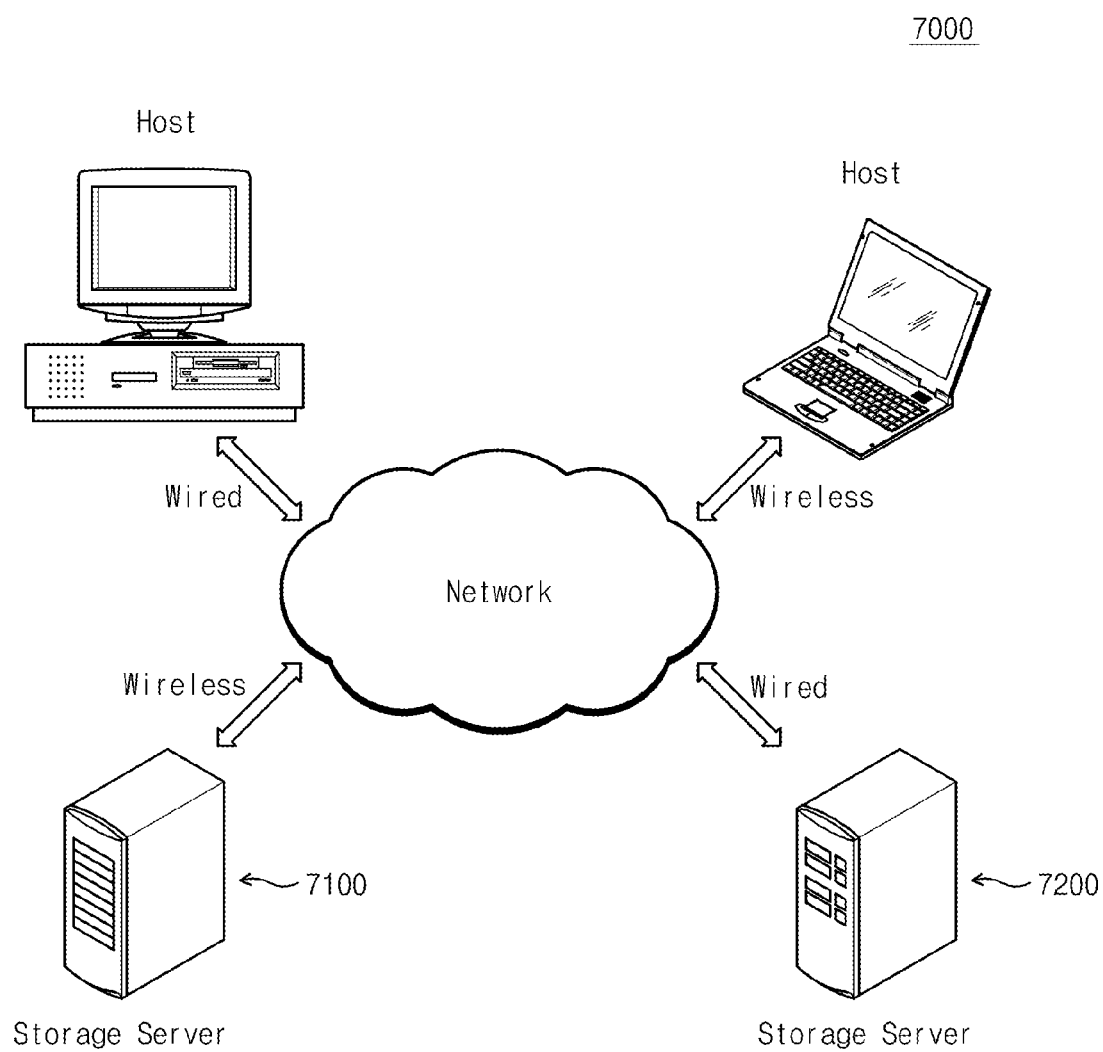
Figure 18:
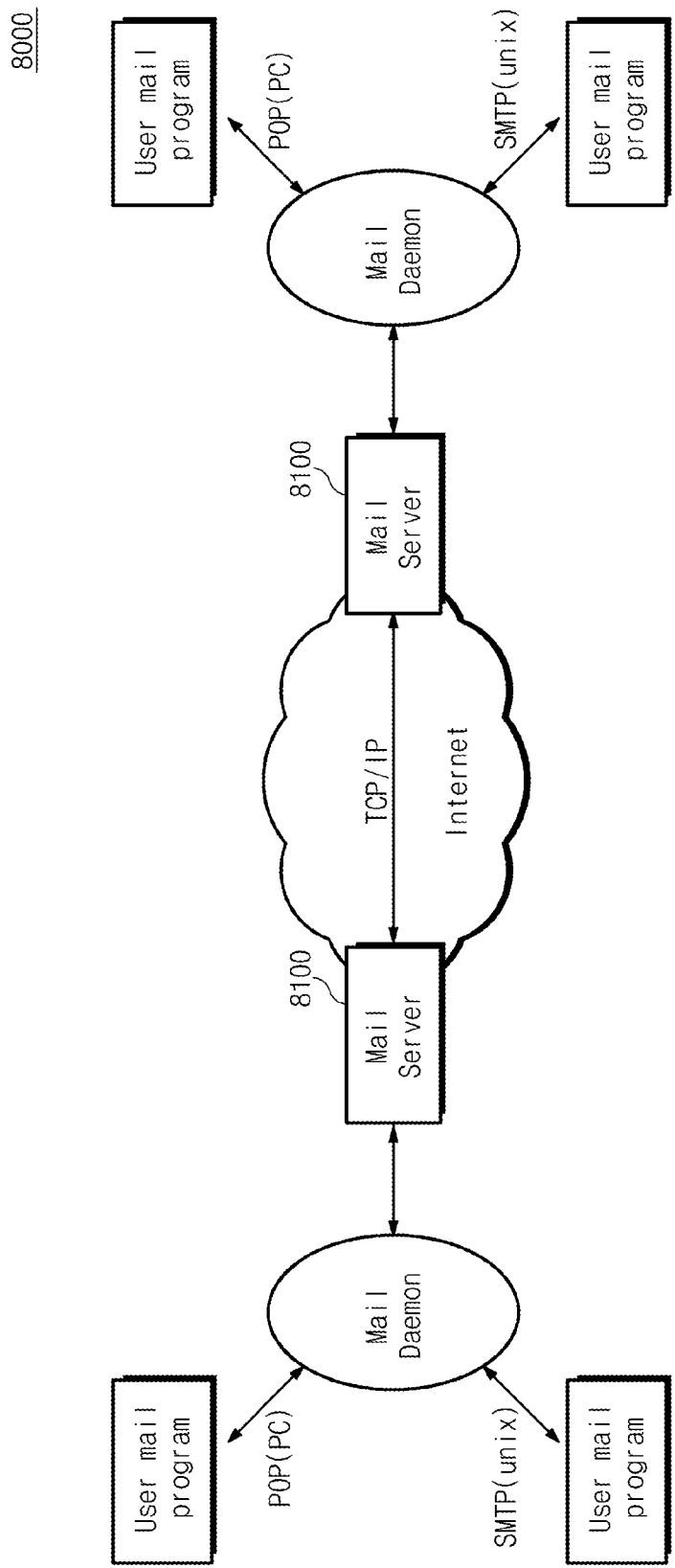

FIGS. 16 to 18 are diagrams of various systems incorporating data storage devices according to embodiments of the inventive concept.

Referring to FIG. 16, a system 6000 comprises a storage apparatus 6100 that communicates with a host in a wired or wireless manner. Referring to FIG. 17, a system 7000 comprises storage servers 7100 and 7200 that communicate with a host by a wired or wireless manner. Referring to FIG. 18, a system 8000 comprises mail servers 8100 that communicate with mail programs via a mail demon connected through POP and SMTP interfaces and mail servers 8100 may communicate through an internet network. Various storage components in systems 6000, 7000, and 8000 can be implemented with SSDs or other memory technologies using selective data compression as described above.

Figure 19:
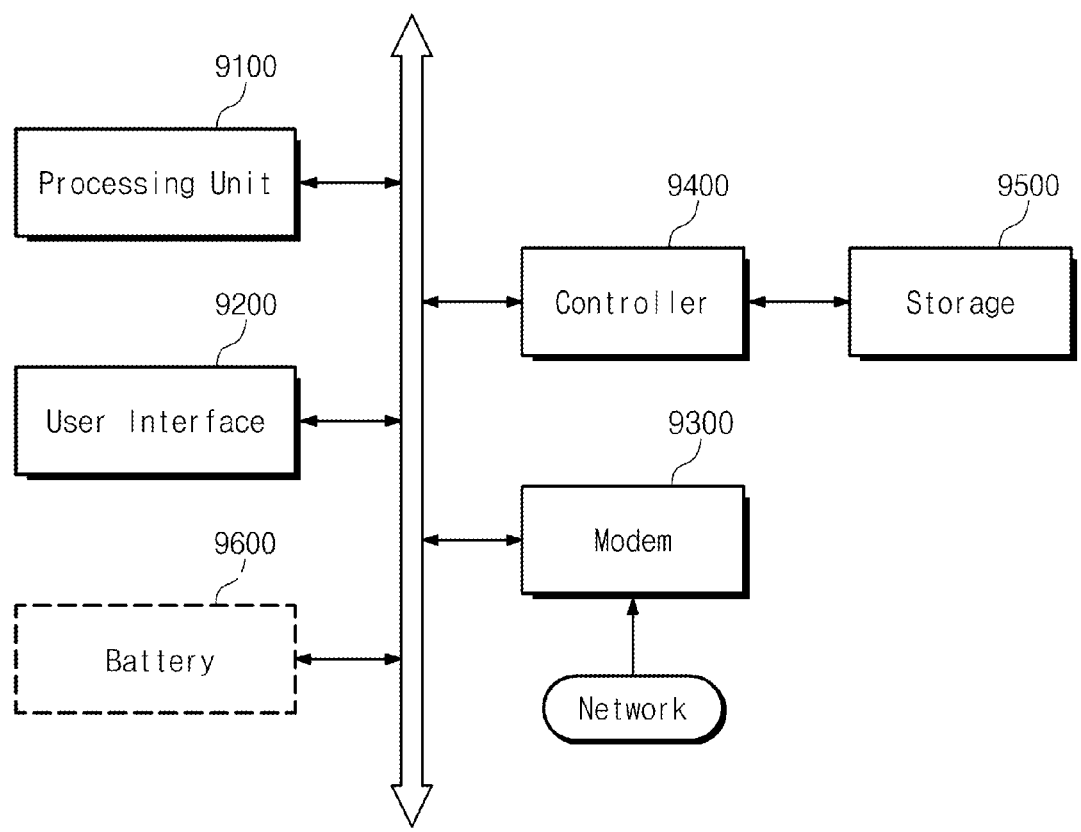
FIG. 19 is a block diagram of a computing system comprising a data storage device according to an embodiment of the inventive concept.

FIG. 19 is a block diagram of a computing system comprising a data storage device according to an embodiment of the inventive concept.

Referring to FIG. 19, the computing system comprises a processing unit 9100, a user interface 9200, a modem 9300 such as a baseband chipset, a memory controller 9400, and a storage medium 9500. Memory controller 9400 and storage medium 9500 form a data storage device and are configured substantially the same as controller 2000 and storage medium 1000 of FIG. 1. N-bit data processed/to be processed by processing unit 9100 is stored in storage medium 9500 through memory controller 9400. Where the computing system is a mobile device, a battery 9600 may be further included to supply an operating voltage. Although not illustrated in FIG. 19, the computing system may further comprise other components such as an application chipset, a camera image processor (CIS), a mobile DRAM, and the like. In some embodiments, memory controller 9400 and storage media 9500 form an SSD.

In the above described embodiments, compression may be performed using any of several available compression algorithms or a combination of two or more thereof. Examples of such compression algorithms include LZ77&LZ78, LZW, Entropy encoding, Huffman coding, Adaptive Huffman coding, Arithmetic coding, DEFLATE, and JPEG. A host interface of a memory controller may be formed of one of computer bus standards, storage bus standards, and iFCPPeripheral bus standards, or a combination of two or more standards. Examples of computer bus standards may include S-100 bus, Mbus, Smbus, Q-Bus, ISA, Zorro II, Zorro III, CAMAC, FASTBUS, LPC, EISA, VME, VXI, NuBus, TURBOchannel, MCA, Sbus, VLB, PCI, PXI, HP GSC bus, CoreConnect, InfiniBand, UPA, PCI-X, AGP, PCIe, Intel QuickPath Interconnect, and Hyper Transport. Examples of storage bus standards include ST-506, ESDI, SMD, Parallel ATA, DMA, SSA, HIPPI, USB MSC, FireWire (1394), Serial ATA, eSATA, SCSI, Parallel SCSI, Serial Attached SCSI, Fibre Channel, iSCSI, SAS, RapidIO, FCIP, and the like. Examples of iFCPPeripheral bus standards include Apple Desktop Bus, HIL, MIDI, Multibus, RS-232, DMX512-A, EIA/RS-422, IEEE-1284, UNI/O, 1-Wire, I2C, SPI, EIA/RS-485, USB, Camera Link, External PCIe, Light Peak, and Multidrop Bus.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A memory controller, comprising:
   a host interface block comprising a compression ratio calculator configured to determine whether a compression ratio of input data exceeds a predetermined compression ratio by determining whether a hit count value of the input data exceeds a reference count value, wherein the hit count value indicates a cumulative number of redundant hits from different sub-units of the input data to a collection of different hash key values; and
   a compression block configured to compress the input data as a consequence of the compression ratio calculator determining that the compression ratio exceeds the predetermined compression ratio.

2. The memory controller of claim 1, further comprising a buffer memory configured to temporarily store the input data in an uncompressed form, wherein the compression block is configured to access the input data from the buffer memory to compress the input data.

3. The memory controller of claim 2, wherein the host interface block further comprises a host buffer manager configured to control buffering of the input data according to a transfer speed difference between a host and a bus connected to the buffer memory and the compression block.

4. The memory controller of claim 3, wherein the compression ratio calculator is configured to calculate the compression ratio of the input data based on data transferred to the host buffer manager.

5. The memory controller of claim 3, wherein the compression ratio calculator is configured to calculate the compression ratio of the input data based on data output from the host buffer manager.

6. The memory controller of claim 2, wherein a result of the determination is stored in a register within the compression block.

7. The memory controller of claim 6, further comprising a processing unit configured to control operations of the memory controller, wherein upon completion of transferring data to the buffer memory, the processing unit controls a compression function of the compression block.

8. The memory controller of claim 7, wherein where the compression ratio calculator determines that the compression ratio exceeds the predetermined compression ratio, the processing unit activates the compression function of the compression block to compress the input data.

9. The memory controller of claim 8, wherein where the compression ratio calculator determines that the compression ratio does not exceed the predetermined compression ratio, the processing unit inactivates the compression function of the compression block such that the input data is directly stored in a storage medium without compression.

10. The memory controller of claim 2, wherein the compression ratio calculator comprises:
    a hash key generating unit configured to sequentially receive data from the buffer memory in predetermined units and to generate hash key values corresponding to the predetermined units; and
    a redundancy detector configured to detect a redundancy level of the input data based on the hash key values generated by the hash key generating unit.

11. The memory controller of claim 10, wherein the hash key generating unit comprises a plurality of hash key generators each receiving some of the predetermined units and performing a common hashing function.

12. The memory controller of claim 11, wherein each of the predetermined units comprises a plurality of bytes, wherein a first group among the plurality of bytes corresponds to a partially overlapping configuration of a second group among the plurality of bytes.

13. The memory controller of claim 10, wherein the redundancy detector comprises:
    a hash table comprising entries corresponding to respective hash key values, wherein each entry stores a flag bit indicating whether a corresponding hash key value has been generated;
    control logic configured to set a flag bit of an entry of the hash table that corresponds to a hash key value provided from the hash key generating unit and further configured to determine whether a currently input hash key value has been generated previously, based on values of entries of the hash table; and
    a counter configured to count the hit count value in response to a control of the control logic, wherein where a currently input hash key value is determined to be generated previously, the control logic controls the counter to increase the hit count value.

14. The memory controller of claim 13, wherein the hit count value indicates the redundancy level, and whether the compression ratio of the input data exceeds the predetermined compression ratio is determined according to whether the hit count value exceeds the reference count value.

15. The memory controller of claim 1, wherein a storage medium and the memory controller constitute a memory system, and wherein the storage medium comprises one or more nonvolatile memory devices connected to the memory controller via one or more channels.

16. The memory controller of claim 1, wherein the compression ratio of the input data is determined based on a hash key value.

17. A method of operating a memory system, comprising:
determining a compression ratio of input data;
determining whether the compression ratio exceeds a threshold by determining whether a hit count value of the input data exceeds a reference count value, wherein the hit count value indicates a cumulative number of redundant hits from different sub-units of the input data to a collection of different hash key values;
compressing the input data upon determining that the compression ratio exceeds the threshold; and
storing the compressed input data in a storage medium.

18. The method of claim 17, wherein determining the compression ratio of the input data comprises determining a level of redundancy of the input data.

19. The method of claim 18, wherein determining the level of redundancy of the input data comprises computing a plurality of hash tags from the input data, and determining a number of the hash tags having a common value.

20. The method of claim 17, further comprising storing the input data in the storage medium without compression upon determining that the compression ratio does not exceed the threshold.

* * * * *